United States Patent [19]
Moyaert
[11] Patent Number: 5,040,295
[45] Date of Patent: Aug. 20, 1991

[54] HAND PRESS AND METHOD FOR THE FABRICATION OF RIBBON CABLES IN PLUG-TYPE CONNECTORS

[75] Inventor: Werner Moyaert, Jabbeke, Belgium
[73] Assignee: Siemens Aktiengesellschaft, Munich, Fed. Rep. of Germany

[21] Appl. No.: 581,577
[22] Filed: Sep. 11, 1990
[30] Foreign Application Priority Data
Sep. 29, 1989 [DE] Fed. Rep. of Germany ....... 3932692
[51] Int. Cl.$^5$ ....................... H01R 43/04; B23P 19/00
[52] U.S. Cl. ....................................... 29/861; 29/749; 29/753
[58] Field of Search ................. 29/749, 750, 751, 753, 29/861, 863, 872, 758

[56] References Cited

U.S. PATENT DOCUMENTS

| | | | |
|---|---|---|---|
| 4,020,540 | 5/1977 | Casciotti et al. | 29/753 X |
| 4,308,657 | 1/1982 | Anderton | 29/749 X |
| 4,393,580 | 7/1983 | Hall, Jr. | 29/749 |
| 4,479,301 | 10/1984 | Resch | 29/751 X |
| 4,488,353 | 12/1984 | Caveney et al. | 29/753 X |
| 4,583,289 | 4/1986 | Beck et al. | 29/861 X |

FOREIGN PATENT DOCUMENTS

3601792C1 4/1987 Fed. Rep. of Germany .

*Primary Examiner*—Carl J. Arbes
*Attorney, Agent, or Firm*—Hill, Van Santen, Steadman & Simpson

[57] ABSTRACT

A cable connecting tool with a force plug for the mounting/compacting of a flat cable inserted in a plug-type connector. The invention provides a sliding table 4 with a cable-end stop, movable in a first direction from a first position into a second position under the force plug, and stored on a base plate 4; and a press insert 3 with a reception compartment for the plug-type connector, this press insert being movable with the sliding table and also on the sliding table in a second direction perpendicular to the first direction; and guide slots for the press insert such that it is moved into the second position towards the cable-end stop when the sliding table is moved, whereby a plug-type connector inserted in the reception compartment for the plug-type connector comes in direct contact with the cable-end stop in the second position.

14 Claims, 2 Drawing Sheets

HAND PRESS AND METHOD FOR THE FABRICATION OF RIBBON CABLES IN PLUG-TYPE CONNECTORS

BACKGROUND OF THE INVENTION

The invention relates to a cable connecting tool with a force plug for the mounting of a flat cable inserted in a plug-type connector.

The accurate position of the ribbon cable to the plug-type connector is very important when the flat cable is fabricated, particularly in the case of end connectors; the cable is to end in flush fashion with a plug connector. This means the cable must not over-project too much in order to avoid a wrong contacting with other components. On the other hand, it must be inserted into the plug connector deeply enough in order to guarantee a safe contacting of the cable with the cutting terminal contacts.

The known hand presses as cable connecting tools are mostly provided with a sliding table whereupon a so-called press insert is stored in slidable fashion. Thereby, the press insert is first brought into a first position for the mounting of the plug-type connector and the cable. Subsequently, the press insert together with the flat cable inserted into the plug-type connector is brought into a second position under the force plug for the pressing together.

In a known embodiment of the press insert, the plug-type connector lies with one side at an end stop. From the direction of the other side of the plug-type connector, the flat cable is pushed into the plug-type connector. Hereby, one cannot clearly recognize whether the flat cable has been pushed through the plug-type connector all the way to the end stop.

In the case of another known hand press, the flat cable is intentionally pushed thus far through the plug-type connector that it projects about 1 cm out of the plug-type connector on the other end. Subsequently, the flat cable is pushed back manually with a slider until it is positioned correctly. This pushing back requires an additional processing step, and in the case of wide ribbon cables it is not easily done either.

SUMMARY OF THE INVENTION

The problems of the known cable connecting tools are solved by the features of a cable connecting tool having: a sliding table with a cable-end stop, stored on a base plate movable in a first direction from a first position into a second position, under a force plug; a press insert with a reception means for the plug-type connector, this press insert being stored on the sliding table movable in a second direction that is normal or perpendicular to the first direction; and means for guiding the press insert such that it is moved into the second position towards the cable-end stop when the sliding table is moved, whereby a plug-type connector inserted in the reception means for the plug-type connector comes in contact directly with the cable-end stop in the second position.

With the cable connecting tool according to the invention the ribbon cable is brought into the correct position in the plug-type connector after it is pushed through the plug-type connector simultaneously with positioning the plug-type connector under the force plug without an additional step to retract the ribbon cable-end into the plug-type connector, and without the uncertainty of whether the cable has been inserted all the way to the end stop.

DESCRIPTION OF THE PREFERRED EMBODIMENT

Figure 1:
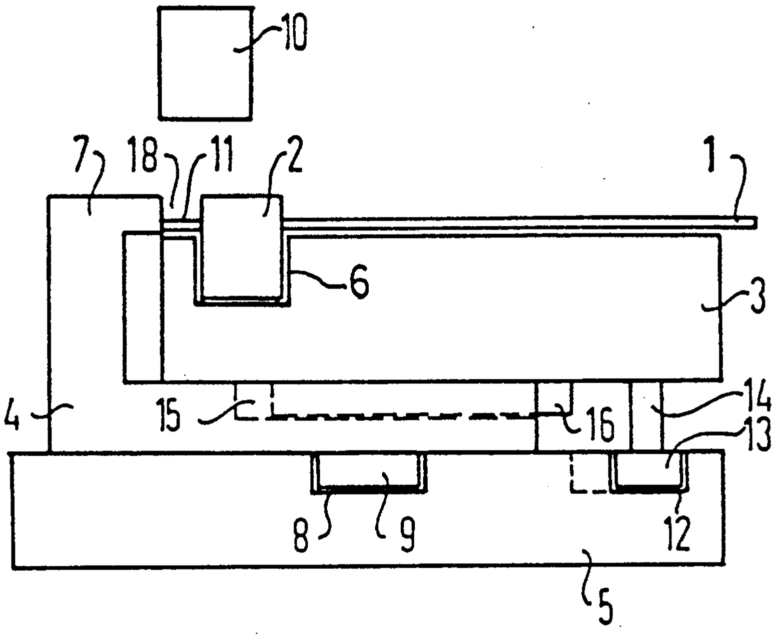
FIG. 1 is a side view of a hand press type cable connecting tool with a sliding table in a first position.
Figure 2:
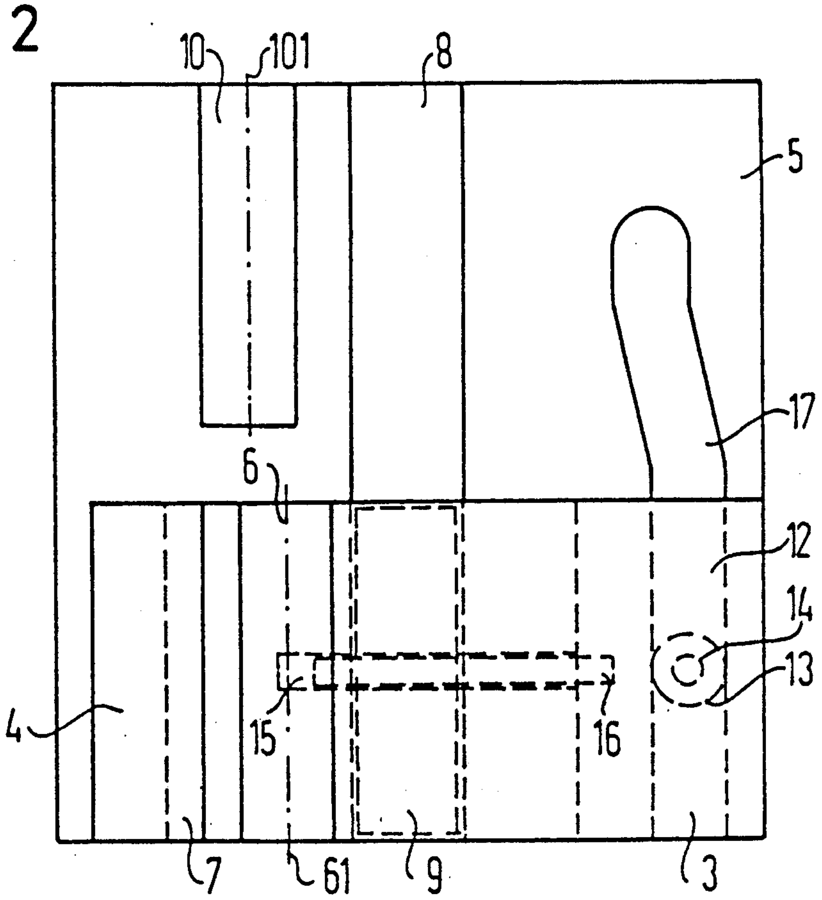
FIG. 2 is a plan view of the cable connecting tool with a sliding table first position.
Figure 3:
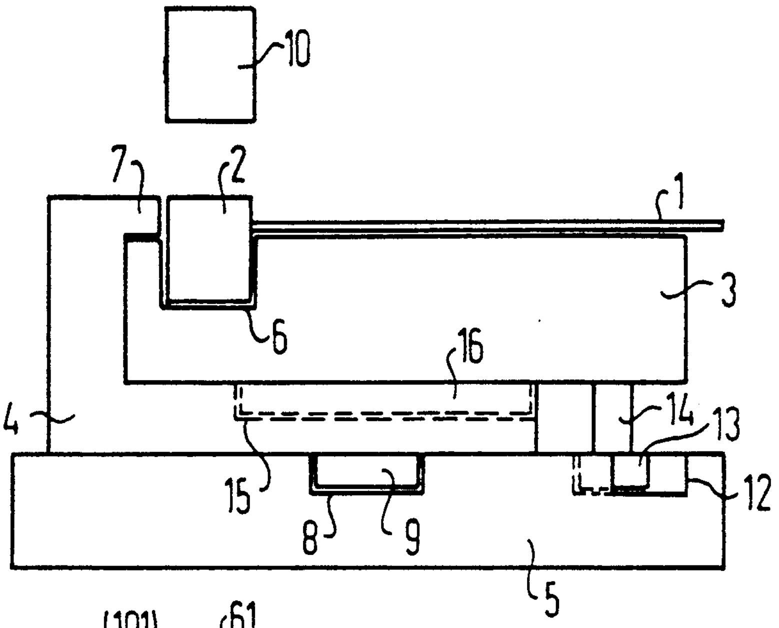
FIG. 3 is a side view of the cable connecting tool with a sliding table in a second position.
Figure 4:
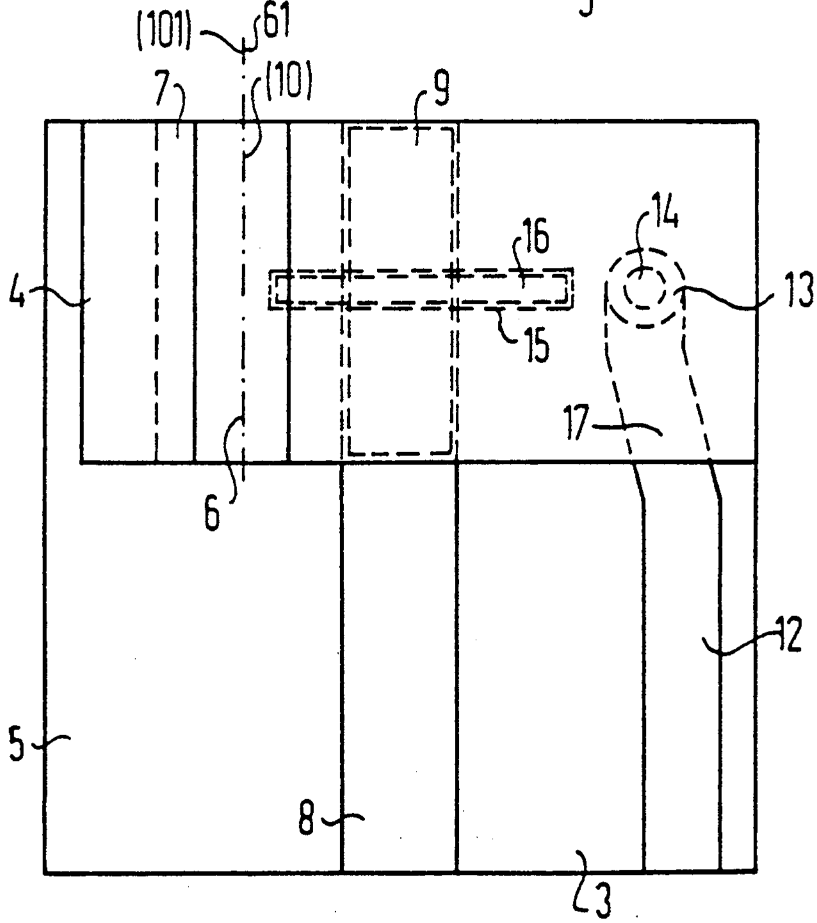
FIG. 4 is a plan view of the cable connecting tool with the sliding table in the second position.

The hand press type cable connecting tool shown in FIGS. 1 to 4 for aligning and fastening a ribbon cable 1 into a plug-type connector 2, has a sliding table 4 which can be moved from a first position as shown in FIGS. 1 and 2, into a second position as shown in FIGS. 3 and 4, with the plug-type connector 2 under a force plug 10. The sliding table 4 is stored in movable fashion on a base plate 5. For guidance, the base plate 5 has a guiding groove 8, in which a guide bar 9 fastened at the sliding table 4 is carried. The moving direction of the sliding table 4 lies parallel to the longitudinal axis 101 of a force plug 10, which is fastened above the base plate 5 at a not shown lifting device. The force plug 10 acts downwardly on the plug-type connector to engage the plug-type connector 2 to the ribbon cable 1.

On the sliding table 4 a press insert 3 is stored movable in one direction. For guiding the press insert 3, a second guide bar 16 is likewise fastened thereon which is carried in a second guiding groove 15 arranged in the sliding table 4. The moving direction of the press insert 3 relative to the sliding table 4 is perpendicular to the moving direction of the sliding table 4 relative to the base plate 5.

Alternatively, instead of the guiding bars 9 and/or 16, two or several guide pins can be arranged at the sliding table 4 and/or the press insert 3, for guide pins can be guided in the corresponding guiding grooVes 8 and/or 15.

The press insert 3 has a plug-type connector reception means or reception compartment 6 in which the plug-type connector 2 can be positioned. The longitudinal axes 61, 101 of the reception means 6 for the plug-type connector and of the force plug 10 respectively, are parallel. The reception means shown in FIGS. 1–4 is a recess formed in the press insert 3. When the sliding table 4 with the press insert 3 is moved in the second position, the reception means 6 for the plug-type connector with the plug-type connector 2 comes into a position under the force plug 10.

In the area pointing to the plug-type connector 2, the sliding table 4 has a cable-end stop 7. The cable-end stop 7 overhangs the press insert 3 and permits the press insert 3 to pass beneath the cable-end stop 7 as the sliding table 4 is brought to the second position, and the plug-type connector 2 is brought together with the cable-end stop 7. This cable-end stop 7 is fashioned such that, in the second position of the sliding table 4, it lies below the force plug 10 directly at the plug-type connector 2 as shown in FIG. 3.

In the first position, as plan view in FIG. 2, the longitudinal axis 61 of the reception means 6 for the plug-type connector is shifted laterally to the right relative to the longitudinal axis 101 of the force plug 10. By that, an intermediate space 18 between the cable-end stop 7 and the plug-type connector 2 stored in the reception means 6 for the plug-type connector, is generated. In the original size, this intermediate space 18 is approximately 1 cm.

In the second position, as plan view in FIG. 4, the two longitudinal axes 61 and 101 are in the same position, i.e. are aligned. The press insert 3 is moved such that the reception means 6 for the plug-type connector is positioned directly under the force plug 10. The pres insert 3 is thereby moved in the direction to the cable-end stop 7. The intermediate space 18 has disappeared and the plug-type connector 2 lies directly at the cable-end stop 7.

In the base plate 5 another guidance groove 12 is provided on the side opposite to the cable-end stop 7. In this guidance groove 12, a guiding pin 13 is guided which is connected with the press insert 3 via a connecting web 14. Between the first and the second position of the sliding table 4, the guidance groove 12 has an offset 17 with the effect that, when the sliding table 4 is moved from the first into the second position under the force plug 10, the press insert 3 is moved perpendicularly to this moving direction. Due to this displacement, the reception means 6 for the plug-type connector with the plug-type connector 2 is brought directly under the force plug 10, as shown in FIGS. 3 and 4.

For the fastening of the ribbon cable 1 in the plug-type connector, this ribbon cable 1 is pushed so far through the plug-type connector 2 that on the opposite side an over-projecting end 11, as shown in FIG. 1, with approximately 1 cm length original size, results. This over-projecting end 11 then presses against the cable-end stop 7 in the first position of the sliding table 4 and spans the intermediate space 18. Because of the over-projecting end 11, the operator can easily control the correct insertion of the ribbon cable 1 in the plug-type connector 2.

When the sliding table is moved into the second position, the press insert 3 moves in the direction toward the cable-end stop 7 due to the offset 17 in the other guidance groove 12. Hereby, also the plug-type connector 2 fastened in the reception means 6 for the plug-type connector, is moved against the cable-end stop 7 whereby the over-projecting end 11 of the ribbon cable 1 is pushed back again, or retracted back into the plug-type connector 2.

In the second position as shown in FIG. 3, the plug-type connector 2 presses against the cable-end stop 7, and the ribbon cable 1 is accurately positioned in the plug-type connector 2. After the mounting, the plug-type connector 2 has no over-projecting cable on the side of the plug 2 residing oppositely to the flat cable 1.

Although the present invention has been described with reference to a specific embodiment, those of skill in the art will recognize that changes may be made thereto without departing from the scope and spirit of the invention as set forth in the appended claims.

I claim as my invention:

1. A method for accurately locating a cable into a plug-type connector for fastening therein comprising the following steps:

provide a base;

provide a sliding table with a cable-end stop at one end, and a lateral guide thereunder, and mount the sliding table on the base in a fashion wherein the sliding table is laterally guided for movement from a first position to a second position in a first direction;

provide a press insert supported on the sliding table with a second lateral guide thereunder, and thereby laterally guide the press insert on the sliding table to move in said first direction with the sliding table but to retain movability with respect to the sliding table in a second direction toward the cable-end stop;

provide a reception means on said press inert to hold a plug-type connector on the press insert;

provide a guiding means which forcibly moves the press insert toward the cable-end stop when said sliding table moves from the first position to the second position, the guiding means arranged to position the plug-type connector within a discrete clearance from the cable-end stop, when the sliding table is in the first position;

and said clearance is diminished as the sliding table reaches the second position;

arrange a plug-type connector on said reception means with a through-bore of said plug-type connector aligned with said second direction;

with the sliding table in the first position, insert a cable into a side of said through-bore opposite a side facing the cable-end stop, insert the cable until it projects through said plug-type connector, spans the clearance, and abuts the cable-end stop;

move the sliding table from the first to the second position.

2. A cable connecting tool for mounting a cable insertably in a plug-type connector, comprising:

a base;

a sliding table with a cable-end stop, slidable in a first direction on said base, from a first position into a second position;

a press insert, having a reception means for holding a plug-type connector, said reception means arranged to provide a clearance between said plug-type connector and said cable-end stop when said sliding table is in said first position, said press insert mounted for movement with said sliding table in said first direction, and movable with respect to said sliding table in a second direction toward said cable-end stop; and means for guiding said press insert such that when said sliding table is moved from said first position to said second position, said press insert is moved with said sliding table in said first direction and forcibly moved towards said cable-end stop in said second direction, reducing said clearance.

3. A cable connecting tool according to claim 2, wherein said means for guiding said press insert comprises: a guiding groove with an offset, formed in said base, said offset turned in a direction toward said cable-end stop; and a first bar member mounted to said press insert and residing in said guiding groove.

4. A cable connecting tool according to claim 3, wherein said means for guiding further comprises: a slot formed into said sliding table, axially aligned with said second direction; and a second bar member mounted to said press insert, and residing in said slot, said second bar member slidable within said slot in said second direction.

5. A cable connecting tool according to claim 2, wherein said cable connecting tool further comprises a second means for guiding, for guiding movement of said sliding table with respect to said base in said first direction.

6. A cable connecting tool according to claim 5, wherein said second means for guiding comprises: a channel arranged in said base and spanning the first direction; and a third bar member connected to said sliding table and residing in said channel.

7. A cable connecting tool according to claim 2, wherein when said sliding table is moved from said first position to said second position said clearance is eliminated.

8. A cable connecting tool used with a force plug for mounting a flat cable insertable into a plug-type connector comprising:

a base plate;

a sliding table with a cable-end stop stored on said base plate and movable in a first direction from a first position into a second position under the force plug;

a press insert with a reception means for the plug-type connector, said press insert mounted for movement with said sliding table in said first direction, and movable in a second direction toward said cable-end stop, said second direction perpendicular to said first direction, said plug-type connector located on said press insert in said first position with a clearance between said plug-type connector and said cable-end stop, said clearance providing for an over-projection of the flat cable through the plug-type connector, the flat cable abutting said cable-end stop; and means for guiding said press insert such that when said press insert is moved with said sliding table in said first direction into said second position, said press insert is forcibly moved toward said cable-end stop, whereby the plug-type connector received by said reception means moves closer to said cable-end stop, decreasing said clearance, and retracting said over-projecting portion of said flat cable into said plug-type connector.

9. A cable connecting tool according to claim 8, wherein said means for guiding said press insert comprises: a guiding groove with an offset, formed in said base plate; and a first bar member mounted to said press insert and residing in said guiding groove, said offset directing said press insert toward said cable-end stop, when said sliding table is moved into said second position from said first position, decreasing said clearance and retracting said flat cable.

10. A cable connecting tool according to claim 9, wherein said means for guiding further comprises: a channel formed in said sliding table arranged axially in said second direction; and a second bar member mounted to said press insert and residing in said slot.

11. A cable connecting tool according to claim 10, wherein said cable connecting tool further comprises a second means for guiding of movement of said sliding table with respect to said base plate, comprising a channel formed in said base plate spanning said first direction, and a third bar member mounted to said sliding table and residing in said channel.

12. A cable connecting tool according to claim 8, wherein said reception means comprises a recess formed in said press insert, for holding a lower portion of said plug-type connector.

13. A cable connecting tool according to claim 12, wherein said clearance is substantially eliminated when said sliding table is moved to said second position.

14. A cable connecting tool according to claim 8, wherein said clearance in said first position is 1 centimeter.

* * * * *